United States Patent [19]

Koya et al.

[11] Patent Number: 5,016,169
[45] Date of Patent: May 14, 1991

[54] DATA PROCESSOR CAPABLE OF CORRECTLY RE-EXECUTING INSTRUCTIONS

[75] Inventors: Kei Koya; Yoshikuni Sato, both of Tokyo, Japan

[73] Assignee: NEC Corporation, Tokyo, Japan

[21] Appl. No.: 173,784

[22] Filed: Mar. 28, 1988

[30] Foreign Application Priority Data

Mar. 27, 1987 [JP] Japan .................................. 62-74910

[51] Int. Cl.$^5$ ................................................ G06F 9/30
[52] U.S. Cl. .................................. 364/200; 364/259.9; 364/256.4; 364/255.5; 364/244.3; 364/239.9
[58] Field of Search ... 364/200 MS File, 900 MS File

[56] References Cited

U.S. PATENT DOCUMENTS

| | | | |
|---|---|---|---|
| 4,434,459 | 2/1984 | Holland et al. | 364/200 |
| 4,442,484 | 4/1984 | Childs, Jr. et al. | 364/200 |
| 4,471,432 | 9/1984 | Wilhite et al. | 364/200 |
| 4,604,691 | 8/1986 | Akagi | 364/200 |
| 4,635,186 | 1/1987 | Oman et al. | 364/200 |

*Primary Examiner*—Thomas M. Heckler
*Attorney, Agent, or Firm*—Foley & Lardner

[57] ABSTRACT

A data processor includes a bus interface coupled to an external bus for transferring information to and from the external bus, an instruction decoding section coupled to the bus interface to receive an instruction through the bus interface from the external bus to decode the received instruction, and an instruction execution unit coupled to receive decoded information from the instruction decoding section to execute the received decoded information. The instruction decoding section includes an instruction decoder receiving an instruction through the bus interface to output the decoded information to the instruction execution unit and to generate tag information, an effective address generator receiving the tag information to calculate an effective address, and a memory management unit receiving the effective address to generate a real address. When the tag information indicates that the decoded information is a predetermined input/output instruction, the memory management unit controls the bus interface to limit data transfer between the external bus and the bus interface until a predetermined condition is satisfied.

5 Claims, 3 Drawing Sheets

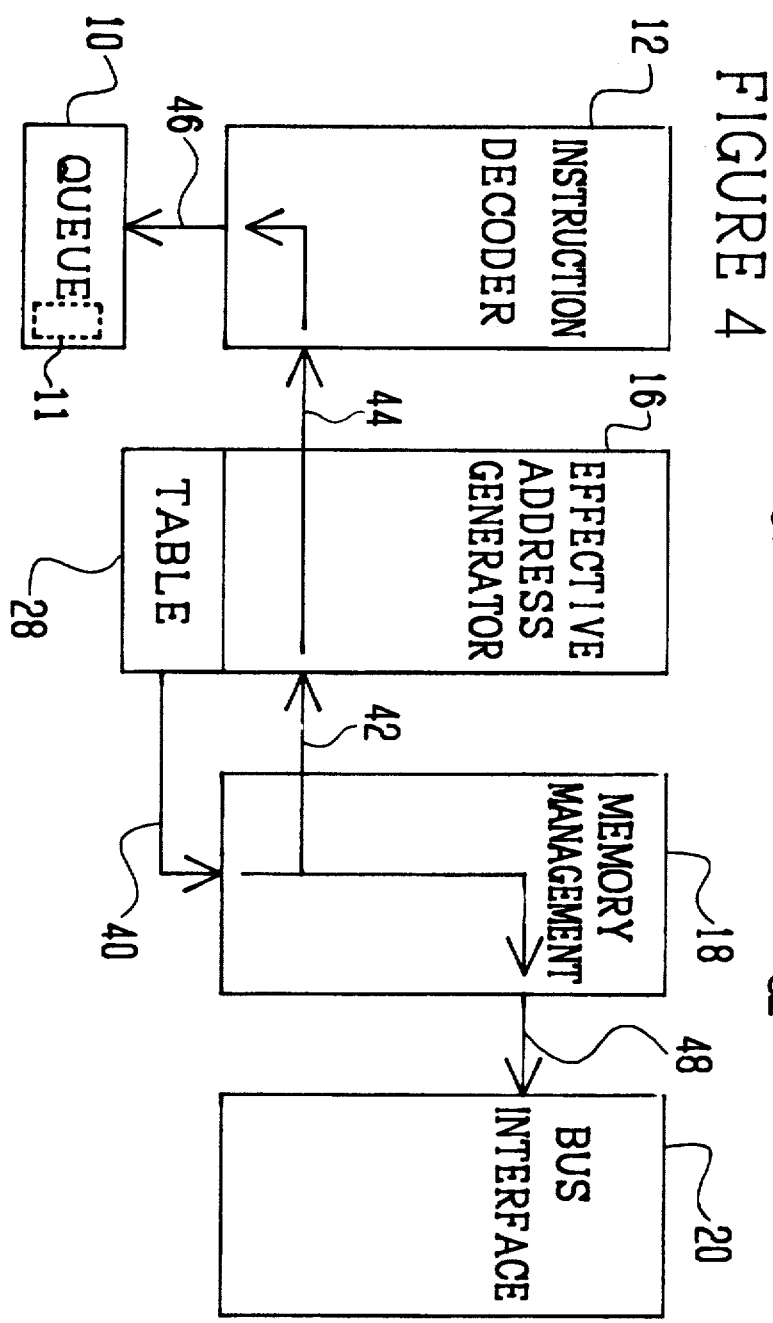

DATA PROCESSOR CAPABLE OF CORRECTLY RE-EXECUTING INSTRUCTIONS

BACKGROUND OF THE INVENTION

1. Field of the Invention

The present invention relates to a data processor, and more specifically to an instruction control system for use in a data processor for controlling re-execution of a given instruction.

2. Description of related art

Central processors, which have adopted the conventional instruction control system, ordinarily comprise a instruction prefetch unit for prefetching instructions through a bus interface from an external bus and accumulating the prefetched instructions so as to form an instruction queue. This instruction prefetch unit is coupled to a instruction decoder so as to supply a code of instruction in response to a request from the decoder. The instruction decoder decodes the added instruction supplied from the instruction prefetch unit, and outputs control information to an instruction execution unit. Further, the execution unit calculates an effective address for a memory operand so as to output it to the bus interface. Thus, the instruction execution unit executes a given operation on the basis of the control information supplied from the instruction decoder. On the other hand, the bus interface executes access to the external memory on the basis of the address supplied from the instruction decoder and also executes a prefetch of an instruction for the instruction prefetch unit.

A central processor having the above mentioned construction is generally operated to fetch an instruction, to decode the instruction, to calculate an address for a memory operand and to read/write to the calculated address. However, if a so called "page fault" occurs at the time of memory access, the processor replaces a page by another page with a unit of one page, and re-executes the operation from a head of the given unit of instruction. For example, in the case of an IN instruction which is one typical example of input/output instructions, the central processor decodes the IN instruction and executes a reading of an input/output address indicated by the instruction so as to write the read data at a predetermined address. If a page fault occurs in the course of the above operation, the central processor carries out a page replacement, and thereafter, re-executes from the head of the instruction.

As mentioned above, when the page fault has occurred, the instruction is re-executed from its head after the replacement of the page. However, in the case of input/output instructions, the data to be read out at the time of re-execution has often become inaccurate. For example, some peripheral pieces of equipment assigned with input/output addresses have often changed the content of data after it had been read in the first place. In this case, it is no longer possible to obtain correct data from the peripheral equipment at the time of re-execution.

In order to avoid the above mentioned problem, it has been necessary to elaborate such a program as to designate an address which will not cause a page fault. However, such a program is inevitably accompanied with various restrictions in programming.

SUMMARY OF THE INVENTION

Accordingly, it is an object of the present invention to provide a data processor which has overcome the above mentioned defect of the conventional one.

Another object of the present invention is to provide a data controller for use in a data processor, which can correctly re-execute an instruction if necessary, without restriction in programming.

A further object of the present invention is to provide a data controller which correctly executes access to a designated input/output address after re-execution which is made after completion of a page replacement performed as the result of a page fault.

The above and other objects of the present invention are achieved in accordance with the present invention by a data processor which includes a bus interface coupled to an external bus for transferring information to and from the external bus, an instruction decoding section coupled to the bus interface for receiving an instruction through the bus interface from the external bus so as to decode the received instruction, and an instruction execution unit coupled to receive a decoded information from the decoder so as to execute the received decoded information. The decoding section includes an instruction decoder receiving an instruction through the bus interface to output the decoded information to the execution unit and to generate tag information, an effective address generator receiving the tag information to calculate an effective address, and a memory management unit receiving the effective address to generate a real address, so that when the tag information indicates that the decoded information is a predetermined input/output instruction, the memory management unit controls the bus interface to limit data transfer between the external bus and the bus interface until a predetermined condition is satisfied.

According to another aspect of the present invention, there is provided a data processor which includes a bus interface coupled to an external bus for transferring information to and from the external bus, an instruction decoding section coupled to the bus interface for receiving an instruction through the bus interface from the external bus so as to decode the received instruction, and an instruction execution unit coupled to receive decoded information from the decoder so as to execute the received decoded information. The decoding section includes an instruction decoder receiving an instruction through the bus interface to output the decoded information to the execution unit and to generate tag information, an effective address generator receiving the tag information to calculate an effective address, a memory management unit receiving the effective address to translate it into a real address, a queue receiving the decoded information from the decoder so as to accumulate the decoded information, and a virtual memory page information table storing information indicative of whether or not an input/output address of a virtual memory location is mapped, so that when the tag information indicates that the decoded information is a predetermined input/output instruction, whether or not the input/output instruction is mapped is discriminated with reference to the table, and then, the memory management unit controls the bus interface on the basis of the result of the discrimination so as to limit data transfer between the external bus and the bus interface until a predetermined condition is satisfied.

BRIEF DESCRIPTION OF THE DRAWINGS

FIG. 3 is a block diagram illustrating one example of an input/output address reference table used in the data processor shown in FIG. 2; and FIG. 4 is a block diagram illustrating operation of the data processor shown in FIG. 2.

DESCRIPTION OF THE PREFERRED EMBODIMENT

Figure 1:
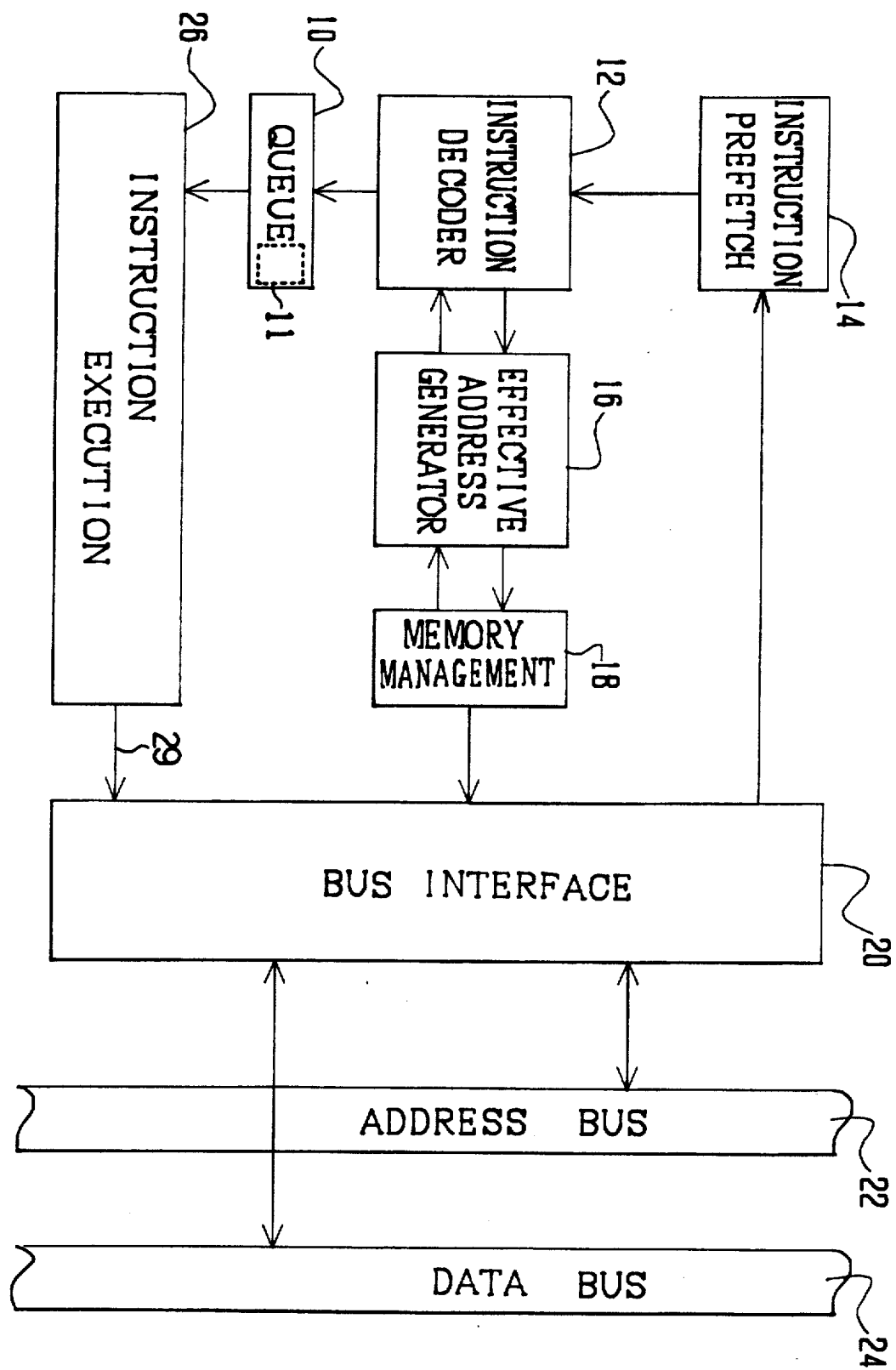
FIG. 1 is a block diagram of a first embodiment of the data processor in accordance with the present invention.

Referring to FIG. 1, there is shown a first embodiment of the data processor in accordance with the present invention, which comprises a queue 10 coupled to an instruction decoder 12 for receiving decoded information so as to accumulate a plurality of items of decoded information. If the instruction decoder 12 decodes an input/output instruction, a predetermined bit 11 of the queue 10 is rendered active by the decoder 12. The decoder 12 receives an instruction from an instruction prefetch 14 for decoding the received instruction so as to supply the decoded information to the queue 10 and tag information to an effective address generator 16. The effective address generator 16 calculates an effective address for a memory operand and outputs the effective address to a memory management unit 18. This memory management unit 18 translates the received virtual address into a real address and outputs the real address to a bus interface 20, which in turn supplies the real address to an address bus 22 so that a read/write operation for a memory address indicated by the real address is executed through a data bus 24. As a result, if an instruction is fetched, the instruction is fed through the bus interface to the instruction prefetch 14. On the other hand, the decoded information is accumulated in the queue 10 and is sequentially read out from the queue 10 to an instruction execution unit 26, which in turn executes the received decoded information.

Now operation of the above mentioned data processor will be described in the case when an input/output instruction is supplied to the decoder 12. If the input/output instruction is fetched into the instruction prefetch 14, the instruction is fed to the decoder 12. The decoder 12 then decodes the received input/output instruction and makes the predetermined bit of the queue 10 active. In addition, the decoder 12 supplies the effective address generator 16 with the tag information which includes therein information indicating that the instruction being decoded is an input/output instruction. On the basis of the received tag information, the effective address generator produces a signal indicating that the instruction being decoded is an input/output instruction and outputs the signal to the bus interface 20. In response to this signal, the bus interface 20 stops the signal transfer between the processor and an external bus.

Next, further description will be made assuming that the input/output instructin is an IN instruction. Ordinarily, the IN instruction includes an input/output port address in a first operand and a memory address in a second operand. As mentioned above, the decoder 12 informs the effective address generator 16 by the tag information that the instruction being decoded is an input/output instruction, and the bus interface 20 stops subsequent bus access in response to the tag information. Thus, the input/output address based on the first operand of the IN instruction is reserved. However, the address calculation is executed as in ordinary cases, so that the address is latched in an input/output address latch (not shown) in the bus interface 20. Thereafter, the second operand address is calculated by the effective address generator 16 and then translated by the memory management unit 18. In the course of this calculation and translation, if a page fault occurs, the execution of the instruction is interrupted or stopped, and then, a page replacement is carried out. Thereafter, the IN instruction is re-executed from its beginning. After this processing is completed, the instruction decoder 12 allows the instruction execution unit 26 to fetch the decoded instruction from the decoded instruction queue 10. At this time, since the predetermined bit 11 of the queue 10 is active as the restult of the decoding of the IN instruction by the instruction decoder 12, the execution unit 26 responds to the predetermined bit 11 of the queue 10 to generate a signal 29 instructing re-start of the bus access and outputs the signal 29 to the bus interface 20. As a result, the bus interface 20 executes reading of the input/output address and writing of the memory address whcih have been reserved. With this, the execution of the IN instruction is completed.

In the above mentioned embodiment, whether or not a predetermined input/output instruction is given on the basis of the tag information derived from a given instruction and the decoded instruction queue, the data transfer between the bus and the bus interface is temporarily stopped in the case of the predetermined input/output instruction. Therefore, even if a page fault occurs, access to the input/output address is retained for a period of a page replacement, and the access to the input/output is executed at the first place in the course of re-execution which is carried after page replacement. Accordingly, data error will not occur and the programming is not limited at all.

Figure 2:
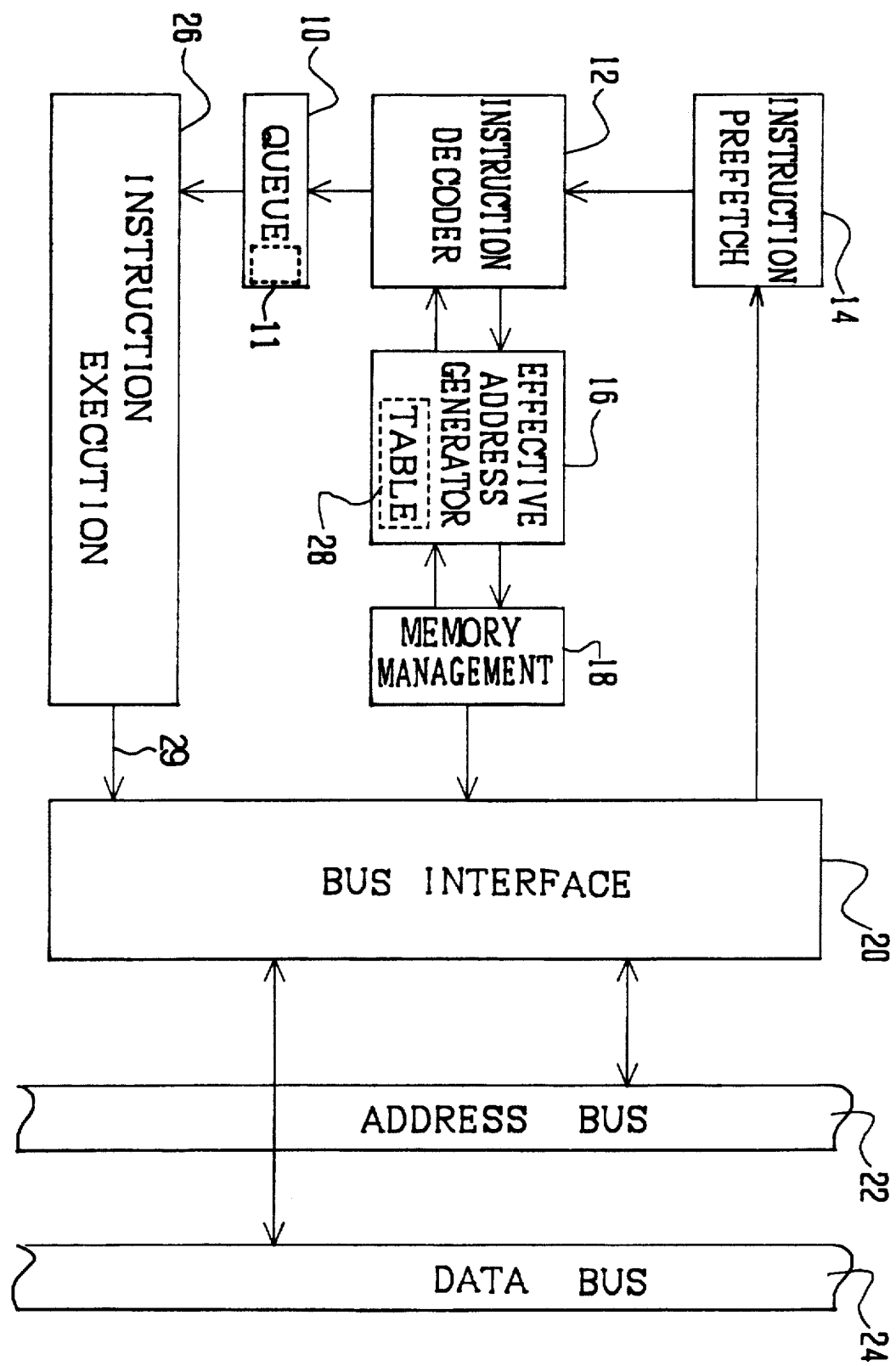
FIG. 2 is a block diagram of a second embodiment of the data processor in accordance with the present invention.

Turning to FIG. 2, there is shown a block diagram of a second embodiment of the data processor in accordance with the present invention, which embodiment adopts a so-called memory mapped input/output. In FIG. 2, circuits similar to those shown in FIG. 1 are given the same Reference Numerals, and explanation thereof will be omitted. However, since the memory mapped input/output is adopted in the second embodiment, the effective address generator 16 is associated with a table 28 indicating pages mapped as a virtual input/output space.

In the first embodiment as mentioned above, the bus interface and the execution unit are controlled on the basis of the tag information and the decoded information obtained by decoding the input/output information. However, in the case when the memory mapped input/output is adopted, access to the input/output is made by an ordinary memory access instruction, and therefore, the number of instructions will be increased. As a result, it becomes difficult to exercise control on the basis of the decoded information.

As is well known, the memory mapped input/output is realized by allocating the input/output space to the virtual memory space. The instruction decoder 12 decodes a memory access instruction and supplies the effective address generator with tag information required for executing address calculation. In response to the tag information, the effective address generator 16 outputs an effective address to the memory management unit 18, where the virtual address is translated into a real address. In this process, table 28 is referred to. For example, this table 28 has an internal structure as shown in FIG. 3. The table constitutes data of 32 bits and has a scale corresponding to several pages in the virtual memory space. Each 32 bit data group of the table is composed of a portion 31 indicative of a base address in a main memory, virtual memory management control bits 32 and a bit 33 indicative of whether or not the page is mapped for input/output mapping. If this bit 33 is "1", it indicates that the input/output mapping is not made.

Next, a signal transfer between the respective units will be explained with reference to FIG. 4, which illustrates signal flow of the data processor shown in FIG. 2. If it is found as the result of reference to the table 28 that there is a request for an access to an address mapped as the input/outpu space, this is indicated from the table 28 through a line 40 to the memory management unit 18. In response to this, the memory management unit 18 generates a signal 42 indicating that the memory access is an access to the input/output space and outputs the signal 42 to the effective address generator 16. The generator 16 outputs a similar signal 44 to the instruction decoder 12 so as to indicate that the memory access is an access to the input/output space. As a result, the decoder 12 sends a signal 46 to the decoded instruction queue 10 so as to indicate that the decoded instruction requires the input/output access. As a result, the predetermined bit 11 of queue 10 is rendered active. Further, the memory management unit 18 rewrites the tag information 48 at the time it is found that the memory access is an access to the input/output space. With reference to the tag information, the bus interface 20 stops subsequent bus access.

Thereafter, if the memory address is calculated and translated and the instruction decoder 12 outputs a signal indicating that the decoded instruction queue is effective, the execution unit 26 responds to the active predetermined bit 11 of the que 10 and receives the decoded information from the queue 10 and then outputs a signal 29 for cancelling the stop of bus access, to the bus interface 20, so that the bus interface 20 executes the read/write reserved for the external bus.

Thus, as mentioned above, by causing the memory management unit to determine input/output access, it is possible to control the input/output instruction without adding data indicative of an input/output access, to the input/output instruction itself or the decoded information. Therefore, input/output control can be easily carried out in the memory mapped input/output.

In this second embodiment, whether or not an input/output address of an input/output instruction is mapped in a virtual memory page information table is determine with reference to the table, and in the case of the mapped input/output, data transfer between the bus and the bus interface is stopped. Therefore, even if a page fault occurs, the reading of the input/output address is retained for a period of page replacement. In re-execution after the completion of the page replacement, the retaining of the reading of the input/output address is cancelled. Accordingly, the data error will not occur and programming is not limited at all, similarly to the first embodiment.

The invention has thus been shown and described with reference to the specific emboidments. However, it should be noted that the present invention is in no way limited to the details of the illustrated structures but changes and modifications may be made within the scope of the appended claims.

We claim:

1. A data processor which includes a bus interface coupled to an external bus for transferring information to and from said external bus, an instruction decoding section coupled to said bus interface to receive an instruction through said bus interface from said external bus so as to decode a received instruction; and an instruction execution unit coupled to receive decoded information from said instruction decoding section to execute received decoded information, comprising the improvement in which said instruction decoding section includes:

an instruction decoder for receiving said instruction through said bus interface to output a decoded instruction to said instruction execution unit and to generate tag information, said tag information including information indicative of an input/output access instruction when said received instruction instructs input/output access, said instruction decoder also generating auxiliary information indicative of said input/output access instruction and outputting said auxiliary information indicative of said input/output access instruction together with said decoded information to said instruction execution unit;

an effective address generator receiving said tag information to calculate an effective address; and a memory management unit receiving said effective address to generate a real address and output said real address to said bus interface, so that when said tag information indicates that said decoded information is said input/output access instruction, said memory management unit outputs to said bus interface a signal indicating that an instruction being decoded is an input/output instruction, so that said bus interface stops data transfer between said external bus and said bus interface and retains said real address received from said memory management unit until a predetermined condition is satisfied, and after said predetermined condition is satisfied, said instruction execution unit responds to said auxiliary information indicative of said input/output access instruction and said decoded information so as to restart said bus interfce so that said bus interface starts a bus cycle for input/output access on the basis of said retained real address received from said memory management unit.

2. A data procesor as claimed in claim 1 wherein said instruction decoding section further includes a queue receiving said decoded information and said auxiliary information indicative of said input/output access information from said instruction decoder so as to accumulate said decoded information and said auxiliary information indicative of said input/output access instruction, said queue being coupled to said instruction execution unit so that said decoded information and said auxiliary information indicative of said input/output access instruction accumulated in said queue is supplied to said instruction execution unit by said queue.

3. A data processor as claimed in claim 2 wherein said instruction decoding section further includes a virtual memory page information table coupled to said memory management unit and storing information indicative of a page on which a virtual memory space is mapped, so that said memory management unit translates said effective address to said real address with reference to said virtual memory page information table whereby, when said tag information indicates that said decoded information is said input/output instruction, and when a determination is made by said memory management unit with reference to said virtual memory page information table that said input/output address is mapped, said memory management unit outputs a control signal to said bus interface on the basis of a result of said determination so that said bus interface stops data transfer between said external bus and said bus interface until a predetermined condition is satisfied.

4. A data processor in which an input/output address space is assigned in a virtual memory space which includes a bus interface coupled to an external bus for transferring information to and from said external bus, an instruction decoding section coupled to said bus interface to receive an instruction through said bus interface from said external bus so as to decode a received instruction; and an instruction execution unit coupled to receive decoded information from said instruction decoding section and to execute said received decoded information, comprising the improvement in which said instruction decoding section includes:

an instruction decoder for receiving said instruction through said bus interface to output said decoded information to said instruction execution unit and to generate tag information;

an effective address generator receiving said tag information to calculate an effective address, and including a virtual memory page information table storing information indicative of a page on which said virtual memory space is mapped;

a memory management unit receiving said effective address and coupled to said virtual memory page information table so as to translate said effective address into a real address with reference to said virtual memory page information table;

a queue receiving said decoded information from said instruction decoder to accumulate said decoded information, said queue being coupled to said instruction execution unit so that said decoded information accumulated in said queue is supplied to said instruction execution unit;

so that when said memory management unit determines from said received effective address with reference to said virtual memory page information table that a memory access is an access to an address on which said input/output address space is mapped, said memory management unit outputs a first signal indicative of access to said input/output space to said effective address generator and said instruction decoder;

so that said instruction decoder outputs a second signal indicative of an input/output access instruction together with said decoded information to said instruction execution unit; and said memory management unit outputs information indicative of said input/output access instruction to said bus interface so that said bus interface inhibits data transfer between said external bus and said bus interface, and while said data transfer is inhibited, said memory management unit completes a memory address calculation and translation, and thereafter said instruction execution unit responds to said decoded instruction accumulated in said queue so as to restart said bus interface to that said bus interface starts a bus cycle for input/output access.

5. A data processor comprising:

a bus interface coupled to an external bus for transferring information to and from said external bus;

an instruction decoder coupled to said bus interface to receive an instruction through said bus interface from said external bus for generating decoded information and tag information, said instruction decoder also generating information indicative of an input/output access instruction when a received instruction instructs input/output access;

a queue coupled for receiving said decoded information and said information indicative of said input/output access instruction from said instruction decoder so as to accumulate said decoded information and said information indicative of said input/output access instruction;

an instruction execution unit coupled to receive said decoded information accumulated in said queue so as to execute said received decoded information, an effective address generator coupled for receiving said decoded information and said tag information from said instruction decode to calculate an effective address; and a memory management unit receiving said effective address to generate a real address, so that when said tag information indicates that said decoded information is said input/output access instruction, said memory management unit controls said bus interface to inhibit data transfer between said external bus and said bus interface and retains an input/output address included in said decoded information, and while said data transfer between said external bus and said bus interface is inhibited, said effective address generator calculates an effective address for a memory address included in said decoded information and said memory management unit translates said calculated effective address for said memory address into a real address for said memory address, and if a page fault occurs, said memory management unit executes a page replacement, and thereafter, said instruction execution unit responds to said information indicative of said input/output access instruction added with said decoded information so as to restart said bus interface so that said bus interface starts a bus cycle for input/output access on the basis of said retained input/output address received from said memory management unit and said real address for said memory address.

* * * * *